United States Patent [19]
Apfel et al.

[11] Patent Number: 5,737,411
[45] Date of Patent: Apr. 7, 1998

[54] BATTERY SWITCHING IN A TELEPHONE SUBSCRIBER LINE INTERFACE CIRCUIT

[75] Inventors: Russell Jay Apfel; Richard Bruce Webb, both of Austin, Tex.

[73] Assignee: Advanced Micro Devices Inc., Sunnyvale, Calif.

[21] Appl. No.: 366,545

[22] Filed: Dec. 29, 1994

[51] Int. Cl.⁶ .................................................. H04M 19/00
[52] U.S. Cl. .................... 379/413; 379/324; 379/398; 379/399; 429/9
[58] Field of Search ............................ 379/412, 413, 379/399, 398, 418; 429/9; 136/252, 293

[56] References Cited

U.S. PATENT DOCUMENTS

| | | |
|---|---|---|
| 4,613,797 | 9/1986 | Eggers et al. .................. 315/241 R |
| 5,138,658 | 8/1992 | Carter et al. .................... 379/413 |
| 5,175,764 | 12/1992 | Patel et al. ..................... 379/399 |
| 5,428,682 | 6/1995 | Apfel ............................. 379/413 |

*Primary Examiner*—Krista Zele
*Assistant Examiner*—Jacques M. Saint-Surin
*Attorney, Agent, or Firm*—Foley & Lardner

[57] ABSTRACT

A telephone subscriber line interface circuit includes a first circuit portion and a second circuit portion, a first battery voltage and a second battery input for receiving a second battery voltage. The second circuit portion is coupled to the second battery input. The telephone subscriber line interface circuit further includes a switch for coupling the first circuit portion to one of the first battery input and the second battery input.

22 Claims, 3 Drawing Sheets

BATTERY SWITCHING IN A TELEPHONE SUBSCRIBER LINE INTERFACE CIRCUIT

BACKGROUND OF THE INVENTION

The invention relates generally to a method and apparatus for powering a telephone subscriber line interface circuit. The invention more particularly relates to a method and apparatus for varying the power supply or battery voltage level in a telephone subscriber line interface circuit in response to the operational mode of the telephone subscriber line.

Subscriber line interface circuits (SLICs) have been developed to provide an interface between a low voltage signal path in a telephone central office and a high voltage telephone subscriber line. The SLIC provides functions such as off hook detection, ringing signal generation and battery feed to the subscriber line. The subscriber line consists of a telephone transmission line, including two conductors referred to as A and B or tip and ring, and the subscriber telephone equipment coupled across the tip and ring conductors. The subscriber line and the subscriber telephone equipment are also referred to as a subscriber loop.

The SLIC provides power from the telephone central office to the subscriber line in response to a received battery voltage. The battery voltage is a DC voltage supplied to the SLIC to power the SLIC and the subscriber line. A typical value of the battery voltage is –48 VDC. The battery voltage has a value generally in the range –20 to –60 VDC. The SLIC supplies a DC current at the battery voltage to the subscriber line. Superimposed on the DC current are AC signals of audio frequency by which information is conveyed between the subscriber and the central office. The battery voltage is generated at the central office, either by a depletable energy storage device such as a battery or by a DC generator, for supply to the SLIC. In a central office, one battery or DC generator supplies the battery voltage to many SLICs and their associated subscriber loops.

In many modern applications, a SLIC is located remote from the central office, relatively close to the subscriber telephone equipment and coupled to the subscriber telephone equipment by a relatively short subscriber line. For example, in fiber in the loop (FITL) applications, the SLIC is located in the same city neighborhood as the subscriber telephone equipment and is coupled to the subscriber telephone equipment by tip and ring conductors no more than a few hundred feet in length. The SLIC or an associated circuit receives optical signals from the central office over an optical fiber and converts the optical signals to AC electrical signals. In response to the electrical signals, the SLIC supplies AC signals of audio frequency, along with DC power from the battery, to the subscriber line. In such applications, where the SLIC and battery are remote from the central office, one battery or battery voltage generator may supply the battery voltage to only one or a few SLICs and their associated subscriber loops.

In applications where a SLIC is used in a central office and there are short lines, the loop voltage drop is low, resulting in a high voltage drop and consequently high power dissipation in the SLIC. In a dense environment of such devices related heating can cause failures. In addition, with SLICs having resistive feed characteristics used in short lines, current is higher, further compounding this problem.

It is desirable to minimize the power consumption of the SLIC and its associated subscriber loop. When power is consumed by the SLIC and the equipment in the subscriber loop, the power is drawn from the battery. The battery may be a depletable energy storage device, such as a lead-acid battery. Alternatively, the battery may be an uninterruptable power supply which converts AC energy from the commercial power grid to the DC battery voltage. Such a power supply includes depletable energy storage devices for providing the battery voltage on a backup basis, when AC energy is not available, for example during a power outage. In order to maintain operation of the subscriber loop, it is important not to deplete the depletable energy storage device to the point where the SLIC and the subscriber loop are no longer operational. This is particularly true during a power outage, which may be accompanied by emergency conditions which require operation of the telephone equipment coupled to and powered through the SLIC.

One way to reduce the power consumption of the SLIC and its associated subscriber loop is to reduce the battery voltage. Power consumption increases with battery voltage. Reducing the battery voltage reduces the power drain on the battery and thus extends the life of the battery.

However, operational constraints limit the extent to which the battery voltage may be reduced. Some equipment associated with a subscriber loop requires a battery voltage of 40 VDC or more. For example, some subscriber loops include a Maintenance Termination Unit (MTU) coupled to the subscriber loop for monitoring the operation of the subscriber loop. In operation, the MTU determines the status of the subscriber loop by monitoring the DC voltage on the loop. To determine the status of the subscriber loop, the MTU detects a voltage of approximately 42.75 VDC. Other equipment, such as facsimile transmission devices, operate by detecting subscriber loop voltages greater than 40 VDC. If the loop voltage is greater than approximately 40 VDC, other equipment on the loop such as the MTU and the facsimile device determines that the subscriber telephone equipment is on-hook and that the subscriber loop may be seized. If the battery voltage is reduced below 40 VDC, equipment on the loop can not accurately determine if the subscriber telephone equipment is on-hook.

Accordingly, when the subscriber telephone equipment is on-hook, the SLIC must provide a DC voltage to the loop of at least 40 VDC. Thus, the battery voltage received by the SLIC from the battery must be greater than 46 VDC to account for overhead voltage required for operation of the SLIC and resistive losses on the subscriber line.

When the subscriber telephone equipment is off-hook, however, the battery voltage can be reduced below 40 VDC. This occurs, for example, when a user is talking on the telephone and the subscriber loop is active. Reducing the battery voltage during talking reduces the power consumption of the subscriber loop without interfering with operation of the subscriber telephone equipment or the SLIC.

In the U.S., currently applicable fiber in the loop specifications require that the line circuit consume less than 900 mW in the off-hook state, while providing at least 20 mA of DC current to the subscriber. IF a battery greater than 40 volts is used, the DC current path consumes 800 mW itself. Therefore, it is necessary to reduce the battery voltage or employ a switching regulator.

However, merely reducing the battery voltage when the subscriber loop is active can create additional problems. Since the SLIC is powered by the battery, variation of the battery voltage may introduce transients and other noise into signals generated by the SLIC. Also, the SLIC includes a hook switch detector which enables the SLIC to determine when the subscriber telephone equipment is either on-hook or off-hook. Variation of the battery voltage may interfere with operation of the hook switch detector, making it difficult for the hook switch detector to determine if the subscriber telephone equipment is on-hook when the battery voltage is reduced when the subscriber loop is active.

SUMMARY OF THE INVENTION

To solve these and other problems, the invention provides a telephone subscriber line interface circuit for coupling to a telephone subscriber line. The telephone subscriber line interface circuit comprises a first circuit portion and a second circuit portion, as well as a first battery input for receiving a first battery voltage and a second battery input for receiving a second battery voltage. The second circuit portion is coupled to the second battery input. The subscriber line interface circuit further comprises a switch for coupling the first circuit portion to one of the first battery input and the second battery input.

It is therefore an object of the invention to provide a subscriber line interface circuit which is adapted to receive at least two battery voltages and to use the battery voltage having a lower potential to provide DC feed to a subscriber line in response to operational conditions on the subscriber line.

It is a further object of the present invention to provide a subscriber line interface circuit which provides a first DC feed characteristic to a subscriber line in response to a first battery potential during a first operational condition, and which provides a second DC feed characteristic to a subscriber line in response to a second battery potential during a second operational condition. In particular, the subscriber line interface circuit uses a second battery voltage having a potential less than approximately 40 VDC and preferably as low as 17 VDC to provide a DC feed characteristic to the subscriber line when the subscriber line is active, and uses a first battery voltage having a potential greater than approximately 40 VDC at all other times.

It is a still further object of the present invention to provide a subscriber line interface circuit which is fabricated in a monolithic integrated circuit and which switches between a first battery potential and a second battery potential to conserve power, but which maintains the substrate of the monolithic integrated circuit at the lowest of the battery potentials.

It is a still further object of the present invention to provide a subscriber line interface circuit which includes a hook switch detector for determining the on-hook or off-hook state of the hook switch of the telephone device attached to the subscriber line and which varies the hook switch detection threshold as the battery voltage is varied from a first potential to a second potential.

BRIEF DESCRIPTION OF THE DRAWINGS

The features of the present invention are set forth with particularity in the appended claims. The invention, together with further objects and advantages thereof, may best be understood by making reference to the following description taken in conjunction with the accompanying drawings, in the figures of which like reference numerals identify identical elements, and wherein:

DETAILED DESCRIPTION OF THE PREFERRED EMBODIMENTS

Figure 1:
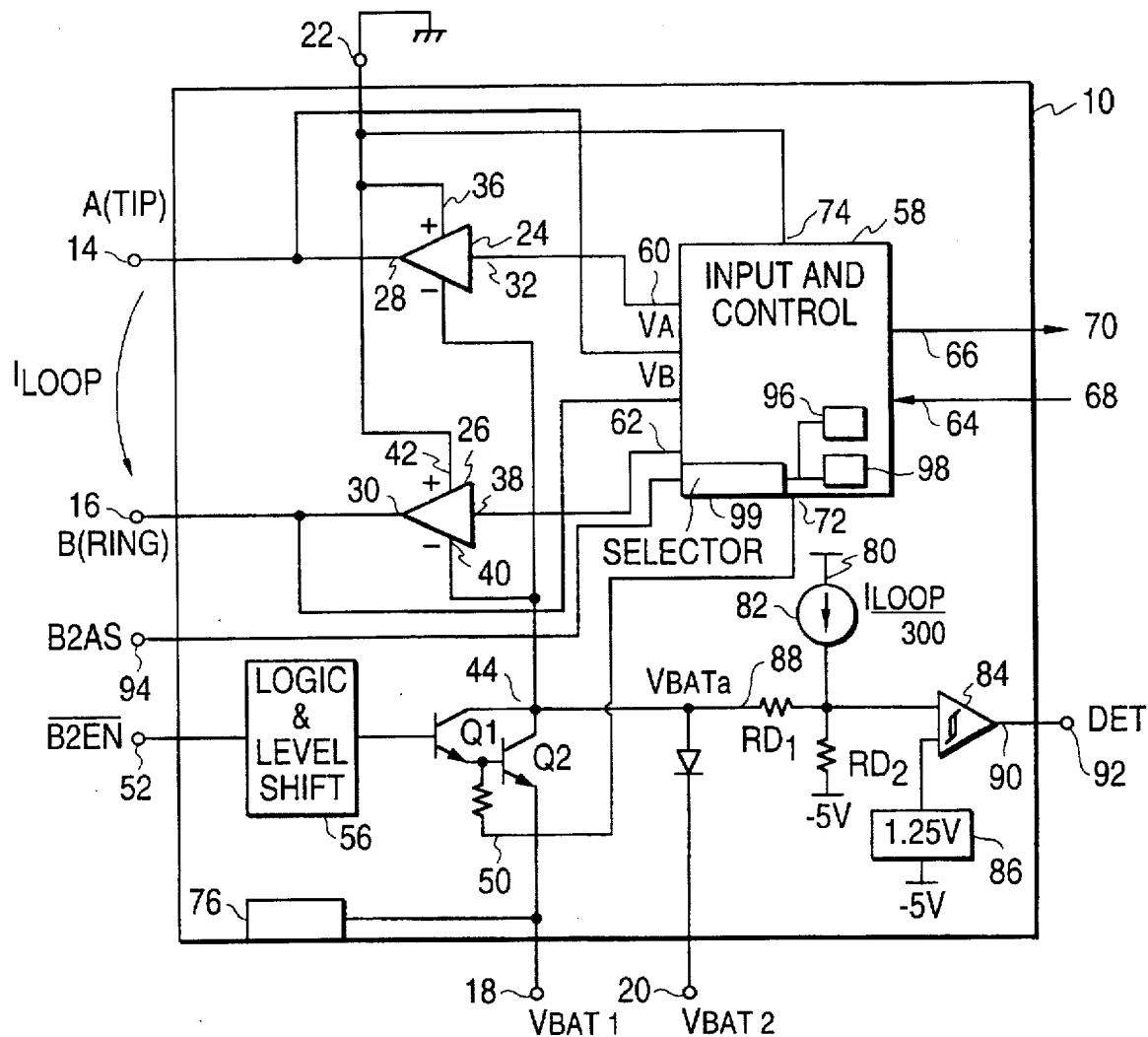
FIG. 1 is a block diagram of a subscriber line interface circuit according to the invention.

Referring now to FIG. 1, it shows a block diagram of a subscriber line interface circuit 10 according to the invention. The subscriber line interface circuit (SLIC) 10 is preferably fabricated as a single monolithic integrated circuit. The subscriber line interface circuit 10 is adapted to be coupled to a telephone subscriber line (not shown). For this purpose, the SLIC 10 includes a tip terminal 14 and a ring terminal 16 for coupling to the tip conductor and ring conductor, respectively, of the telephone subscriber line.

For operation of the subscriber line, including subscriber telephone equipment coupled to the subscriber line, the SLIC 10 supplies a DC current at a DC voltage known as the battery voltage to the subscriber line. This is known as the DC feed or battery feed. The battery voltage is also used to power portions of the SLIC 10. The battery voltage is generated by either a depletable energy storage device such as a battery or by a DC generator for supply to the SLIC. The SLIC 10 includes a first battery terminal 18 and a second battery terminal 20 for receiving two battery voltages, $V_{BAT1}$ and $V_{BAT2}$, respectively. In accordance with the present invention, $V_{BAT2}$ is a more negative voltage than $V_{BAT1}$. Both $V_{BAT1}$ and $V_{BAT2}$ are negative voltages relative to ground and preferably $V_{BAT1}$ has a value in the range $-40.5$ VDC to $-58$ VDC and $V_{BAT2}$ has a value in the range $-16$ VDC to $V_{BAT1}$. The SLIC 10 also includes a battery ground terminal 22 for coupling to battery ground potential.

Superimposed on the DC current provided by the SLIC 10 to the subscriber line are AC signals of audio frequency by which information is conveyed from the SLIC 10 to the subscriber line. For providing both the AC signals and the DC current, the SLIC 10 includes a first output amplifier 24 having an output 28 coupled to the tip terminal 14 and a second output amplifier 26 having an output 30 coupled to the ring terminal 16.

The first output amplifier 24 has a signal input 32, a battery voltage terminal 34 and a battery ground terminal 36. The second output amplifier 26 has a signal input 38, a battery voltage terminal 40 and a battery ground terminal 42. According to the invention, the battery ground terminal 36 of the first output amplifier 24 and the battery ground terminal 42 of the second output amplifier 26 are each connected to the battery ground terminal 22 of the SLIC 10. Further according to the invention, the battery voltage terminal 34 of the first output amplifier 24 and the battery voltage terminal 40 of the second output amplifier 26 are each coupled to an output 44 of a battery selection circuit 46.

The battery selection circuit 46 includes a logic and level shift circuit 48 and a switch 50. The logic and level shift circuit 48 has an input 52 coupled to a battery enable terminal 54 of the SLIC 10 and an output 56 coupled to the switch 50. The switch 50 preferably comprises a Darlington-coupled bipolar transistor pair Q1, Q2 but could be any switchable circuit element with high current conductivity in one mode and low current conductivity in a second mode, such as a field effect transistor. The emitter of Q2 is coupled to the first battery terminal 18 of the SLIC 10 and the collector of Q1 and Q2 is coupled to the output 44 of the battery selection circuit 46.

The battery selection circuit 46 allows the battery voltage supplied to the output amplifiers 24, 26 to be switched in response to the operational mode of the SLIC 10. For example, industry standards require that the voltage supplied by the SLIC 10 to a subscriber line coupled to the tip terminal 14 and the ring terminal 16 comprise AC signals superimposed on a DC voltage. In some operational modes, the DC voltage must be greater than approximately 40 VDC. For example, in standby mode where the telephone equipment coupled to the subscriber line is on-hook, 40 VDC must be supplied by the output amplifiers 24, 26 so that other equipment on the loop can detect the on-hook condition.

In the active mode, the battery selection circuit 46 switches to alter the battery voltage supplied to the first output amplifier 24 and the second output amplifier 26. Operation in the active mode occurs when the telephone device coupled to the subscriber line is taken off-hook, for example, during talking. When the telephone device is off-hook, there is no longer a requirement to supply a large voltage, such as 40 VDC, to the subscriber line to allow on-hook detection by other equipment. Moreover, switching from the first battery voltage $V_{BAT1}$ when in the standby mode to the second battery voltage $V_{BAT2}$ when in the active mode allows the subscriber loop to operate at reduced power levels in the active mode, since $V_{BAT2}$ preferably has a lower absolute value than $V_{BAT1}$.

Responsive to a signal B2EN on line 54, the battery terminals are coupled to the output amplifiers 24, 26 via the switch formed by transistors $Q_1$ and $Q_2$. The logic and level shift circuit 56 provides the appropriate input to the switch. The signal on line 54 is generated in response to the hook state and system requirements. In the simplest scenario the DET signal on line 92 is used as the signal on line. 54. If the subscriber line is in an on-hook state, the first battery terminal 18 is coupled to the output amplifiers 24, 26 through the $Q_1$, $Q_2$ switch. If the subscriber line is in off-hook state, the switch formed by transistors $Q_1$ and $Q_2$ couples the second battery terminal 20 to the output amplifiers 24, 26. However, most systems have additional requirements. For example, if the telephone device coupled to the subscriber line changes from an on-hook state to an off-hook state, an external circuit may delay forming a signal on line 54 to operate the switch 50 for a time, such as 150 msec., pending receipt of signals indicative of dialing. Dialing signals produced by a rotary telephone may introduce noise on the node containing the battery voltage. This noise may interfere with proper operation of the SLIC 10. Therefore, the output amplifiers 24, 26 remain coupled to the first battery terminal 18 until dialing is complete to isolate circuitry coupled to the second battery terminal 20 from the noise produced by dialing.

The SLIC 10 further includes an input and control circuit 58. The input and control circuit 58 provides functions such as power feed control. The input and control circuit 58 has a first output 60 coupled to the input 32 of the first output amplifier 24 and a second output 62 coupled to the input 38 of the second output amplifier 26. The input and control circuit 58 has an input 64 for receiving electrical signals representative of audible sound. The input 64 is coupled to an input terminal 68 of the SLIC 10. The input terminal 68 is adapted to be coupled to another device such as a subscriber line audio processing circuit (SLAC) for communicating with the SLAC.

In response to the electrical signals received at the input 64, the input and control circuit 58 conveys electrical signals from the outputs 60, 62 to the output amplifiers 24, 26, respectively. In response to the electrical signals received from the input and control circuit 58, the output amplifiers 24, 26 provide to the subscriber line coupled to the tip terminal 14 and ring terminal 16 AC signals of audio frequency by which information is conveyed between the subscriber and the SLIC 10. The input and control circuit 58 also has an output 66 coupled to an output terminal 70 of the SLIC 10. The output terminal 70 is adapted to be coupled to another device, such as a SLAC for conveying to the SLAC electrical signals representative of audible sound received from the subscriber line by circuitry not illustrated in FIG. 1.

In accordance with the invention, the input and control circuit 58 further includes a battery voltage terminal 72 and a ground terminal 74. The battery voltage terminal 72 is connected directly to the first battery terminal 18. The ground terminal 74 is connected directly to the battery ground terminal 22. Supply of the battery voltage provided at the first battery terminal 18 to the battery voltage terminal 72 is unaffected by operation of the battery selection circuit 46 including switching of the switch 50. The battery voltage supplied to the input and control circuit 58 at the battery voltage terminal 72 remains the battery voltage provided at the first battery terminal 18.

As indicated above, the SLIC 10 is preferably fabricated from a single monolithic integrated circuit including a substrate of a semiconductor such as silicon. The SLIC 10 includes substrate contacts, illustrated generally as substrate contact 76 in FIG. 1. The substrate contacts provide an electrical connection between the substrate and the lowest potential in the circuit, provided to the SLIC 10 at the first battery terminal 18. In accordance with the present invention, the substrate contact 76 and all substrate contacts in the SLIC 10 are coupled to the first battery terminal 18 and are not coupled to the second battery terminal 20.

Coupling all the substrate contacts to the first battery terminal 18 assures that the substrate of the integrated circuit including the SLIC 10 remains at the lowest potential in the circuit, $V_{BAT1}$. Moreover, coupling all the substrate contacts to the first battery terminal 18 assures that the substrate voltage does not change when the battery voltage supplied to the output amplifiers 24, 26 changes. If the potential supplied to the substrate contacts was varied when the battery voltage supplied to the output amplifiers 24, 26 was varied by the battery switching, performance of the SLIC 10 could be adversely affected. For example, variation in the substrate voltage could cause turn-on of P-N diodes which include the substrate as one active region. Also, variation in the substrate voltage could cause injection of minority carriers into the substrate which also creates a risk of turn-on of substrate diodes. Turn-on of substrate diodes is preferably avoided to maintain operation of the SLIC in a known, controlled state.

The SLIC 10 further includes a hook switch detector circuit 80. The hook switch detector circuit 80 includes a current source 82, a comparator 84, a reference voltage generator 86, and resistors $R_{D1}$ and $R_{D2}$. The hook switch detector circuit 80 has an input 88 and an output 90. The output 90 is coupled to a hook switch detection terminal 92 of the SLIC 10.

When the telephone device coupled to the subscriber line at the tip and ring terminals 14, 16 is taken off-hook, the hook switch detector circuit 10 detects the off-hook condition and provides an off-hook indication to the hook switch detection terminal 92. The hook switch detector circuit 10 is responsive to the loop current $I_{LOOP}$ flowing in the subscriber loop between the tip terminal 14 and the ring terminal 16. When the telephone is off-hook, a DC path is created in the subscriber loop and greater loop current flows in the subscriber loop. The off-hook current is greater than the on-hook current and greater than a predetermined threshold of the hook switch detector circuit 80. This increase in current is used to determine the off-hook condition.

However, the magnitude of the loop current $I_{LOOP}$ is dependent on the DC voltage supplied to the subscriber loop by the SLIC 10. For the same given loop resistance, more current will flow in response to $V_{BAT1}$ than will flow in response to $V_{BAT2}$, where $V_{BAT1}$ is a battery voltage supplied to the output amplifiers 24, 26 having a larger magnitude than $V_{BAT2}$. It should be noted that if the device is operating in the constant current region, the currents will be the same. Therefore, in order to accurately detect the off-hook condition, the predetermined threshold of the hook switch detection circuit 80 varies along with the battery voltage supplied to the output amplifiers 24, 26 for providing DC feed to the subscriber line.

Figure 2:
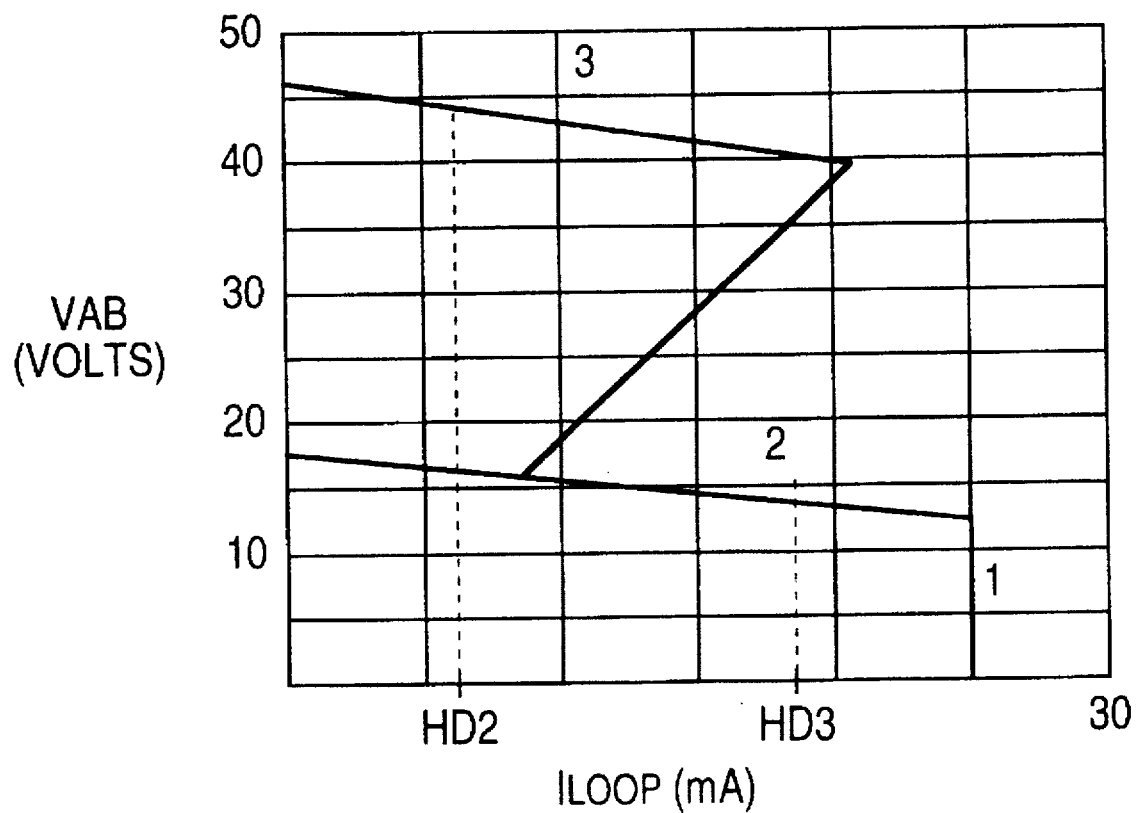
FIG. 2 is a graphical representation of a DC feed characteristic associated with the subscriber line interface circuit of FIG. 1.

FIG. 2 is a graphical representation of a DC feed characteristic associated with the subscriber line interface circuit of FIG. 1. FIG. 2 shows the relationship between the DC voltage across the tip and ring terminals 14, 16 (FIG. 1) and the loop current $I_{LOOP}$ supplied to the subscriber loop coupled to the tip and ring terminals 14, 16.

In FIG. 2, the DC feed characteristic has three distinct operational regions. In the first region, labelled 1 on FIG. 2, the telephone device coupled to the subscriber loop is off-hook and substantial DC current flows in the subscriber loop. The current is limited to a value, for example, of 25 mA. In the first region, the DC feed voltage supplied to the subscriber loop is relatively low, less than 20 VDC, in response to the application of the second battery voltage $V_{BAT2}$ to the output amplifiers 24, 26 (FIG. 1).

In the second operational region, labelled 2 in FIG. 2, the loop current $I_{LOOP}$ varies linearly with the output voltage $V_{AB}$. The second region includes a hook switch detection threshold current, labelled HD2 in FIG. 2. When the second battery voltage $V_{BAT2}$ is supplied to the output amplifiers 24, 26 to provide DC feed to the subscriber line, the hook switch detection circuit 80 provides an on-hook indication to the hook switch detection terminal 92 only when the loop current $I_{LOOP}$ is less than HD2.

In the third operational region, labelled 3 in FIG. 2, the loop current $I_{LOOP}$ also varies linearly with the output voltage $V_{AB}$. The third region includes the operational mode where the telephone device is on-hook and substantially zero current flows in the subscriber loop. The third region includes a hook switch detection threshold current, labelled HD3 in FIG. 2. When the first battery voltage $V_{BAT1}$ is supplied to the output amplifiers 24, 26 to provide DC feed to the subscriber line, the hook switch detection circuit 80 provides an off-hook indication to the hook switch detection terminal 92 only when the loop current $I_{LOOP}$ exceeds HD3.

The values of HD2 and HD3, according to the invention, are combinations of a fixed value and a variable value. The variable value is a function of the battery voltage, $V_{BATa}$ switched in by the switch $Q_1$ and $Q_2$ at a particular point in time. The fixed value is, for example 1.25V reference 86 in FIG. 1. Assuming a nominal −5V supply, the voltage at the inputs of amplifier 84, which acts as a comparator, is −3.75 volts. The voltage drop across resistor $R_{D2}$ is 1.25 volts and the voltage across $R_{D1}$ is $V_{BATa}-3.75$ volts. At hook detection, the product of the current in $R_{D2}$ and $R_{D2}$ is 1.25 volts. The current in $R_{D2}$ can be found from current source 82 and the current in $R_{D1}$ and where multiplied by $R_{D2}$ equals 1.25 volts at hook detection. Thus, at hook detection $$\left(\frac{I_{Loop}}{300} - \frac{(V_{BATa}-3.75)}{R_{D1}}\right) R_{D2} = 1.25 \tag{1}$$

solving equation (1):

$$I_{Loop} = \frac{V_{BATa}}{R_{D1}}(300) - \frac{3.75}{R_{D1}}(300) + \frac{1.25}{R_{D2}}(300) \tag{2}$$

setting the constant terms=$I_D$ $$I_{Loop} = \frac{V_{BATa}}{R_{D1}}(300) + I_D \tag{3}$$

For purposes of this analysis $I_D$ can be assumed to be approximately zero. Thus, an expression for loop current at hook detection is:

$$I_{Loop} = \frac{V_{BATa}}{R_{D1}}(300) \tag{4}$$

From equation (4) it is clear that the loop current for hook switch detection increases with battery voltage. For example, assuming $R_{D1}$ is 1M ohm, when battery voltage $V_{BATa}$ is 20 V, $I_{LOOP}$ for hook switch detection is 6 mA. When $V_{BATa}$ is 50 V, $I_{LOOP}$ for hook switch detection is 15 mA. Thus, according to the invention the hook switch threshold is a function of a fixed value, the reference, and a variable value, the battery voltage.

In an alternative arrangement according to the invention, resistor $R_{D1}$ in FIG. 1 can be eliminated and resistor $R_{D2}$ can be connected to ground. In addition, the fixed 1.25 volt reference in the detector input is replaced with a circuit 95 that generates a reference equal to a fraction, for example 1/20, of the loop voltage, or line voltage, $V_A-V_B$. Such an arrangement according to the invention is shown in FIG. 3.

Figure 3:
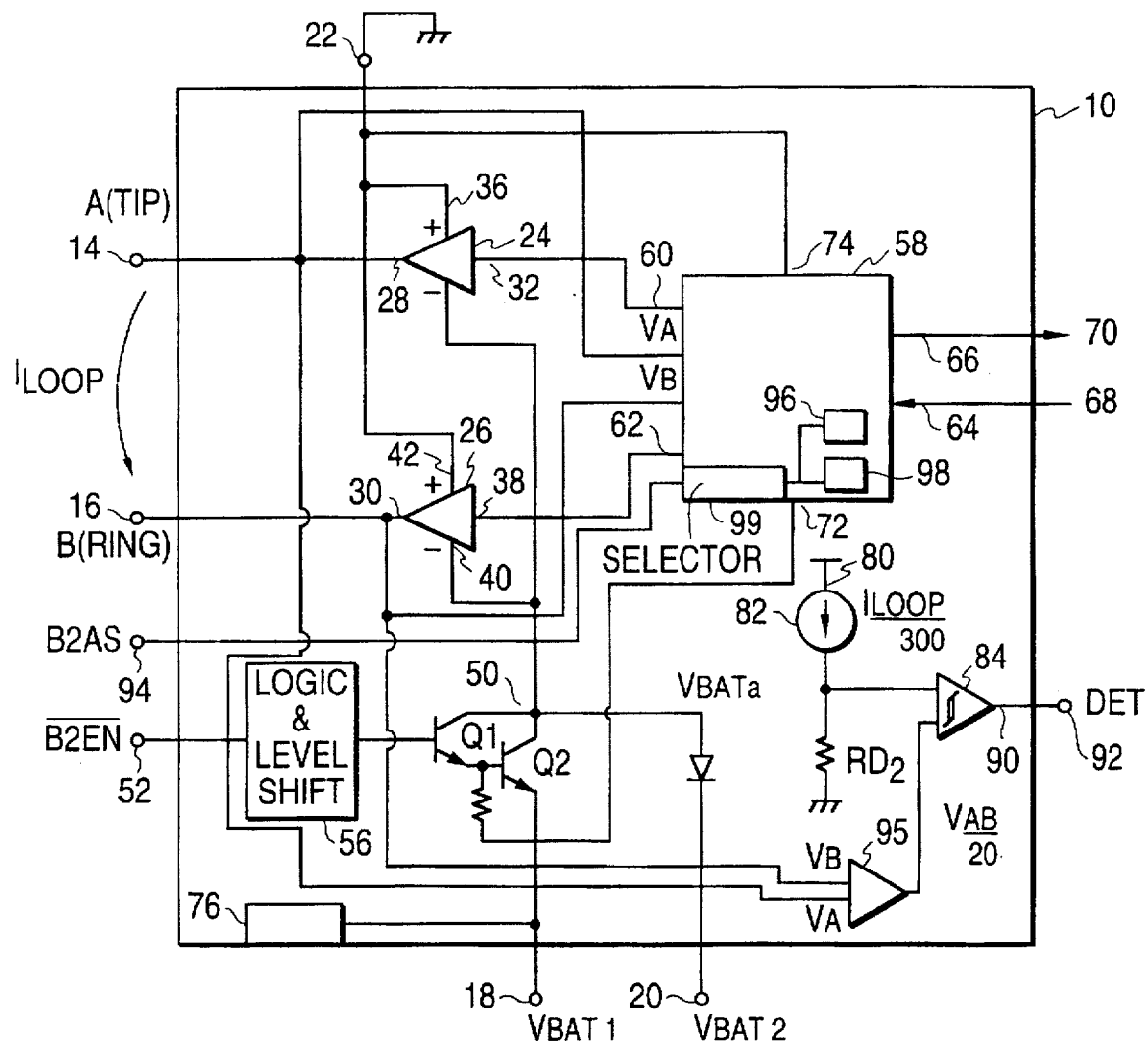
FIG. 3 is a block diagram of an alternative subscriber line interface circuit according to the invention.

As is apparent from FIG. 3, the product of the current $I_{LOOP}/300$ and $R_{D2}$, is the voltage across $R_{D2}$ and equals the voltage $(V_A-V_B)/20$ on the other terminal of amplifier 84 at the hook switch detection threshold. Thus, writing $V_A-V_B$ as $V_{AB}$, $$\frac{I_{Loop}}{300} R_{D2} = \frac{V_{AB}}{20} \tag{5}$$

Since $V_{AB}$ is the loop voltage, $V_{AB}$ also equals the product of the loop current, $I_{LOOP}$ and loop resistance, $R_{LOOP}$. Replacing for $V_{AB}$:

$$\frac{I_{Loop}}{300} R_{D2} = \frac{I_{Loop}R_{Loop}}{20} \tag{6}$$

Canceling the common terms and solving for $R_{LOOP}$ $$R_{Loop} = \frac{R_{D2}}{15} \tag{7}$$

at the hook switch detection threshold.

An important feature of this arrangement is that the hook switch detection point is now only a function of loop resistance and is not a function of the loop current for a particular battery. In systems which depend on loop current or battery voltage alone, as for example one system according to the invention previously discussed herein with respect to equations (1) through (4) and shown in FIG. 1, the result of this dependency is that variations in performance can occur from when switching batteries while the SLIC operates in the resistive region. The alternative embodiment according to the invention discussed with respect to equation (5) through (7), eliminates such battery dependent performance variations. Thus, the potential for oscillations and other undesirable effects when changing batteries in the hook switch state is virtually eliminated.

In another aspect of the apparatus according to the invention, input and control circuit 58 includes antisaturation circuitry which limits the line voltage, $V_{AB}$, to keep the amplifiers out of saturation. A battery independent antisaturation circuit limits the open circuit voltage to the output allowable from a battery at its lowest possible voltage. This is called the low battery case. Because it is independent of the battery, such battery independent antisaturation circuitry has good noise immunity and power supply rejection. However, because it must limit the open circuit voltage to accommodate the low battery case, battery independent circuitry suffers from limited dynamic range.

A battery dependent antisaturation circuit can operate to achieve the highest open circuit voltage possible from the battery, but is less noise immune than the battery independent antisaturation circuit. Due its wide dynamic range, the battery dependent circuit is preferable in order to obtain the highest possible open circuit voltage for battery output voltage (the high battery case). Various battery independent and battery dependent antisaturation circuits are known in the art, for example, as disclosed in Advanced Micro Devices Telecommunications Products Data Book 1992–93, incorporated herein by reference, where such circuits are shown on pages 1-10 through 1-12. However, the SLIC according to the invention employs a combination of battery independent and battery dependent antisaturation circuits 96 and 98.

According to the invention, the battery feed characteristic is switched by a selector circuit incorporated, for example, into input and control circuitry 58. Such a selector 99 may be a switch of conventional design switching between the battery dependent and battery independent antisaturation circuits. Referencing FIG. 2, in the feed characteristic shown in region 3, a circuit according to the invention employs a battery dependent or battery tracking antisaturation circuit in input and control circuitry 58 while the battery voltage is lower than a first threshold of, for example, about 45 volts. This allows the highest possible open circuit for the battery and maximizes dynamic range when battery voltage is less than about this first threshold of, for example, 45 volts. When the battery voltage exceeds the first threshold of, for example, about 45 volts, input and control circuit 58 switches to a battery independent antisaturation circuit. Thus, the threshold for battery independent operation is set high in the on-hook state. When operating in region 2 of FIG. 2, the same battery circuit is used with a modified or second threshold.

In another alternative configuration, the threshold value of the battery independent antistauration circuit can be selected between a first threshold value for the low battery (off hook) case and a second threshold value for the high battery (on hook) case. This alternative can be used in conjunction with a battery dependent circuit or the battery dependent circuit can be eliminated in order to reduce cost and power.

FIGS. 1 and 3 show a separate input, B2AS, to input and control circuit 58 for controlling this function. As previously discussed herein, input and control circuit 58 is responsive to signal B2EN on line 54, which reflects the hook switch state, to switch the battery feed characteristic by switching the batteries. In most cases, signal B2AS on line 94 would be connected directly to signal B2EN on line 54, thus operating the antisaturation circuits in direct correspondence to battery switching. However, with signal B2AS on line 94, it is also possible to operate the antisaturation circuit switching function independently of the signal B2EN on line 54 or in some other customized relationship to this signal.

As can be seen from the foregoing, the invention provides a subscriber line interface circuit for coupling to a subscriber telephone line. The subscriber line interface circuit provides both AC signals and DC voltage to power the subscriber line. To reduce power consumption in the subscriber loop, especially during emergency conditions, the subscriber line interface circuit couples a battery voltage having a lower magnitude to the subscriber line when the subscriber line is active. Only circuitry which substantially reduces overall power consumption in response to the reduced battery voltage may be coupled to the reduced battery voltage. All other circuitry is coupled to a fixed, invariant voltage. In addition, to ensure accurate on-hook detection, the subscriber line interface circuit includes an on-hook detection circuit having a threshold which varies with the battery voltage supplied to the output amplifiers.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A telephone subscriber line interface circuit coupled to a telephone subscriber line, the telephone subscriber line interface circuit comprising:

a first circuit portion;

a second circuit portion;

a first battery input for receiving a first battery voltage;

a second battery input for receiving a second battery voltage, the second battery voltage having a lower absolute value than the first battery voltage, and the second circuit portion being coupled to the second battery input;

a switch for coupling the first circuit portion to one of the first battery input when the switch is in a first state and the second battery input when the switch is in a second state; and means for providing one of a first DC feed characteristic from the first battery input and a second DC feed characteristic from the second battery input to said telephone subscriber line coupled to said subscriber line interface circuit in accordance with the state of said switch.

2. A telephone subscriber line interface circuit as recited in claim 1, wherein the telephone subscriber line includes a tip conductor and a ring conductor and wherein the first circuit portion includes a first output amplifier for providing a first signal to the tip conductor and a second output amplifier for providing a second signal to the ring conductor.

3. A telephone subscriber line interface circuit as recited in claim 2, wherein the telephone subscriber line interface circuit is fabricated on a semiconductor substrate and wherein the second circuit portion includes an electrical contact to the semiconductor substrate, the semiconductor substrate being connected to the second battery input.

4. A telephone subscriber line circuit as recited in claim 3, wherein the second battery input is at a less negative potential than the first battery input.

5. A telephone subscriber line circuit as recited in claim 1, further comprising a hook switch detection circuit, the switch being responsive to a hook switch state indicated by the hook switch detection circuit.

6. A telephone subscriber line interface circuit as recited in claim 5, wherein the hook switch detection circuit has a hook detection threshold, the hook detection threshold being variable.

7. A telephone subscriber line interface circuit as recited in claim 6, wherein the hook detection threshold is a combination of a fixed value and a variable value.

8. A telephone subscriber line interface circuit as recited in claim 7, wherein the fixed value is a fixed offset.

9. A telephone subscriber line interface circuit as recited in claim 7, wherein the variable value is an active battery value, the active battery value being a value of the battery voltage switched in by the switch at a particular time.

10. A telephone subscriber line interface circuit as recited in claim 9, wherein the hook detection threshold increases with increasing battery voltage.

11. A telephone subscriber line interface circuit as recited in claim 6, wherein the hook detection threshold is a function of loop resistance.

12. A telephone subscriber line interface circuit as recited in claim 11, wherein the hook detection threshold increases with increasing loop resistance.

13. A subscriber line interface circuit as recited in claim 1, wherein a first feed characteristic is active when the switch couples the first circuit portion to the first battery input and a second feed characteristic is active when the switch couples the first circuit portion to the second battery input.

14. A subscriber line interface circuit as recited in claim 13, further comprising a hook switch detection circuit, the switch being responsive to a hook switch state indicated by the hook switch detection circuit.

15. A telephone subscriber line interface circuit coupled to a telephone subscriber line, the telephone subscriber line interface circuit comprising:

a first circuit portion;

a second circuit portion;

a first battery input for receiving a first battery voltage;

a second battery input for receiving a second battery voltage, the second battery voltage having a lower absolute value than the first battery voltage, and the second circuit portion being coupled to the second battery input;

a switch for coupling the first circuit portion to one of the first battery input when the switch is in a first state and the second battery input when the switch is in a second state; and an antisaturation circuit connected to limit amplifier swing to a range determined by line voltage, said antisaturation circuit comprising a battery dependent antisaturation circuit, a battery independent antisaturation circuit and a selector circuit; and means for providing one of a first DC feed characteristic from the first battery input and a second DC feed characteristic from the second battery input to said telephone subscriber line coupled to said subscriber line interface circuit in accordance with the state of said switch.

16. A subscriber line interface circuit as recited in claim 15, further comprising a hook switch detection circuit, the switch being responsive to a hook switch state indicated by the hook switch detection circuit, wherein the selector circuit selects between the battery independent antisaturation circuit and the battery dependent antisaturation circuit in response to the hook switch state.

17. A subscriber line interface circuit as recited in claim 16, wherein in an on-hook state, the selector circuit selects the battery dependent antisaturation circuit for line voltages below a predetermined threshold and switches to the battery independent antisaturation circuit for line voltages exceeding the predetermined threshold.

18. A subscriber line interface circuit as recited in claim 17, wherein the predetermined threshold has an absolute value of about 45 volts.

19. A subscriber line interface circuit as recited in claim 16, wherein in an off-hook state, the selector circuit selects the battery independent antisaturation circuit for line voltages below a second predetermined threshold.

20. A subscriber line circuit as recited in claim 16, wherein in an off-hook state, the selector circuit selects the battery dependent antisaturation circuit for line voltages below a second predetermined threshold.

21. A subscriber line interface circuit as recited in claim 16, wherein said antisaturation circuit comprises a battery independent antisaturation circuit.

22. A subscriber line interface circuit as recited in claim 21, wherein said battery independent antisaturation circuit has a first threshold for a low battery case and a second threshold for a high battery case.

* * * * *